United States Patent [19]

Okochi

[11] Patent Number: 4,881,014
[45] Date of Patent: Nov. 14, 1989

[54] STABILIZED ELECTRIC POWER APPARATUS FOR GENERATING DIRECT AND ALTERNATING CURRENT SIMULTANEOUSLY IN ONE TRANSFORMER

[75] Inventor: Sadao Okochi, Fussa, Japan

[73] Assignee: Kabushiki Kaisha Toshiba, Kanagawa, Japan

[21] Appl. No.: 287,632

[22] Filed: Dec. 20, 1988

Related U.S. Application Data

[63] Continuation of Ser. No. 32,017, Mar. 30, 1987, abandoned.

[30] Foreign Application Priority Data

Mar. 31, 1986 [JP]   Japan ................................. 61-73423

[51] Int. Cl.⁴ ............................................. H05B 41/16
[52] U.S. Cl. .................................. 315/246; 315/240; 315/244; 315/291; 315/DIG. 1; 315/DIG. 7
[58] Field of Search ............... 315/240, 243, 244, 246, 315/291, 290, 309, DIG. 1, DIG. 4, DIG. 7, 185 R, ; 363/21, 22, 26, 97; 323/267

[56] References Cited

U.S. PATENT DOCUMENTS

| | | | |
|---|---|---|---|
| 3,170,085 | 2/1965 | Genvit | 315/244 |
| 4,371,918 | 2/1983 | Schierjott | 363/22 |
| 4,392,087 | 7/1983 | Zansky | 315/244 |
| 4,451,876 | 5/1984 | Ogata | 363/21 |
| 4,486,823 | 12/1984 | Palm | 363/21 |
| 4,535,399 | 8/1985 | Szepesi | 363/97 |
| 4,553,070 | 11/1985 | Sairanen et al. | 315/244 |
| 4,677,534 | 6/1987 | Okochi | 363/26 |
| 4,687,971 | 8/1987 | Shimizu | 315/244 |

*Primary Examiner*—Leo H. Boudreau
*Assistant Examiner*—Michael Razavi
*Attorney, Agent, or Firm*—Finnegan, Henderson, Farabow, Garrett and Dunner

[57] ABSTRACT

The present invention comprises a switching circuit which converts direct current electric power into a pulse; an insulative transformer which includes a primary coil for loading a generated pulse, coils for direct and alternating current outputs which are provided on the secondary coil side of the insulative transformer; an impendance circuit for controlling current which is connected with the coil for alternating the output; a control circuit which controls the switching circuit so that the output voltage of the coil for the direct current output is kept constant; and a fluorescent lamp connected with the coil for alternating the current output. The circuit can obtain the alternating current without secondary switching.

4 Claims, 13 Drawing Sheets

| RELATIVE INPUT VOLTAGE | BASIC VOLTAGE AMPLITUDE |
|---|---|
| $V_o/\underline{V_o}$ | $A_1/A_{10}$ (NOTE) |
| 0.85 | 0.995 |
| 0.9 | 0.997 |
| 1.0 | 1.000 |
| 1.1 | 0.997 |
| 1.15 | 0.993 |

(NOTE) $A_{10}$: BASIC VOLTAGE AMPLITUDE FOR $V_o = \underline{V_o}$
$A_1$: BASIC VOLTAGE AMPLITUDE $w = 2\pi f$ $P_1: \dfrac{1}{wC_3} > wL_2$ $P_2: \dfrac{1}{wC_3} < wL_2$

STABILIZED ELECTRIC POWER APPARATUS FOR GENERATING DIRECT AND ALTERNATING CURRENT SIMULTANEOUSLY IN ONE TRANSFORMER

This application is a continuation of application Ser. No. 032,017, filed Mar. 30, 1987.

The present application claims priority of Japanese Patent Application No. 61-73423 filed on Mar. 31, 1986.

FIELD OF THE INVENTION AND DESCRIPTION OF THE RELATED ART

The present invention relaes to a stabilized electric apparatus which can supply direct and alternating current simultaneously to the load in one transformer and can be used for facsimile optical character readers (referred to as OCR hereinafter).

FIG. 25 illustrates a known multi-output stabilized electric power apparatus used for facsimile, OCR and so on.

In FIG. 25, character $V_0$ denotes the direct current, $Q_1$ denotes the transistor for switching, $T_1$ denotes the inverter transformer, $N_p$ denotes the primary coil, $D_1$ and $D_2$ denote diodes for rectification, $C_1$ denotes the smoothing capacitor, $L_1$ denotes the choke coil.

INV denotes the inverter which outputs the alternating current by switching the voltage $V_1$, $T_2$ denotes the transformer for transforming the alternating current outputted from INV, $C_2$ denotes the filter capacitor, Rl denotes the alternating load.

$A_1$ denotes the error amplifier circuit for comparing the direct output voltage $V_1$ with a standard input voltage $V_R$ and outputs the signal corresponding to the difference, PWM denotes the pulse width modulation circuit which outputs a pulse modulation width corresponding to the cross-point of signals outputted from the error amplification circuit $A_1$ and triangular waves outputted from the oscillation circuit OSC, and DR denotes the drive circuit which amplifies the pulse and loads it into the base of the transistor $Q_1$.

While the stabilized direct output voltage $V_1$ is generated, the alternate output is generated from the stabilized direct output voltage $V_1$ by the inverter INV and transformer $T_2$.

The amount of the current flowing in the alternating load Rl is detected by resistor $R_s$ and the signal in accordance with the amount is fed back in the inverter INV. The inverter INV changes the switching timimg of voltage $V_1$ and operates to make the current constant.

In the stabilized electric power apparatus as shown in FIG. 25, a constant voltage and a constant current can be fed to a direct current load and an alternating current load, respectively. However, the stabilized electric power apparatus should have two sets of switching circuits such as a switching transistor $Q_1$ and an inverter INV, and in addition, two sets of transformers $T_1$ and $T_2$, therefore, the arrangement of the circuit is complicated and requires a large number of component parts. As a result, the high cost of manufacturing the stabilized electric power apparaus has become a problem.

As shown in U.S. Patent Application No. 814,494, filed on Dec. 30, 1985, a power source circuit having one transformer and one switching transistor for producing direct current output and alternate current output was developed in an attempt to solve this problem.

However, in the facsimile and the OCR, the alternating load Rl is a fluorescent lamp which is used as the luminous source of an image sensor. Since the luminous source of an image sensor is required to have less flicker, it is necessary that it be used at in a higher frequency.

At this time, alternating current to be outputted shall meet the following requirements;

(a) The inverter INV must be able to start a fluorescent lamp.

A fluorescent lamp does not start electrical discharging unless a higher voltage is added than for lighting. Therefore, the alternating output must be able to generate this discharge starting voltage.

(b) The inverter INV must be able to control the current of the fluorescent lamp.

Since the fluorescent lamp has a negative resistance characteristic, when the practical current increases, the load voltage decreases and causes an increase in current. Therefore, to stabilize the current, it is necessary to connect the impedance with it in series and it is required that an alternating output line impedance for stabilizing be provided.

(c) The inverter must not reduce the life of fluorescent lamp lighting.

In general, since the lighting life of a fluorescent lamp is reduced when an excessively large or small current is supplied, it is necessary to keep alternating output current which flows in the fluorescent lamp within required ranges.

OBJECT AND SUMMARY OF THE INVENTION

An object of the present inventionis to provide a power apparatus for taking out alternating current power and direct current power from voltage created in secondary coils in one transformer, in which, when an alternating current load having a negative resistance characteristic is connected to a direct current power source, an impedance circuit is connected to the secondary coils from which alternating current power is taken out, in order to stabilize an alternating current fed to the alternating current load.

Another object of the present invention is to provide a stabilized electric power apparatus for taking out alternating current power and direct current power from voltage created in secondary coils in one transformer.

Yet another object of the present invention is to provide a forward type electric power apparatus having one switching transistor, for taking out alternating current power and direct current power from a voltage created in secondary coils.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the stabilized electric power apparatus of the present invention comprises a switching circuit for swiching direct current electric ower, an insular transformer provided with a primary oil for loading a generated pulse, coils for direct and alternating current outputs provided at the secondary coil side of the insular transformer, an impedance for current controlling connected with the coil for alternating output, a control circuit which controls the swiching circuit so that the output voltage of the coil for a direct current output can be constant and an alternating load with a negative resistance property connected with the coil for alternating output.

In the stabilized electric power apparatus of the present invention, stabilized alternating current power can be fed to an alternating current load connected to secondary coils in a transformer and having a negative resistance characteristic.

DETAILED DESCRIPTION OF THE PREFERRED EMBODIMENTS

The present invention will be explained in detail with the accompanying drawings.

Figure 1:
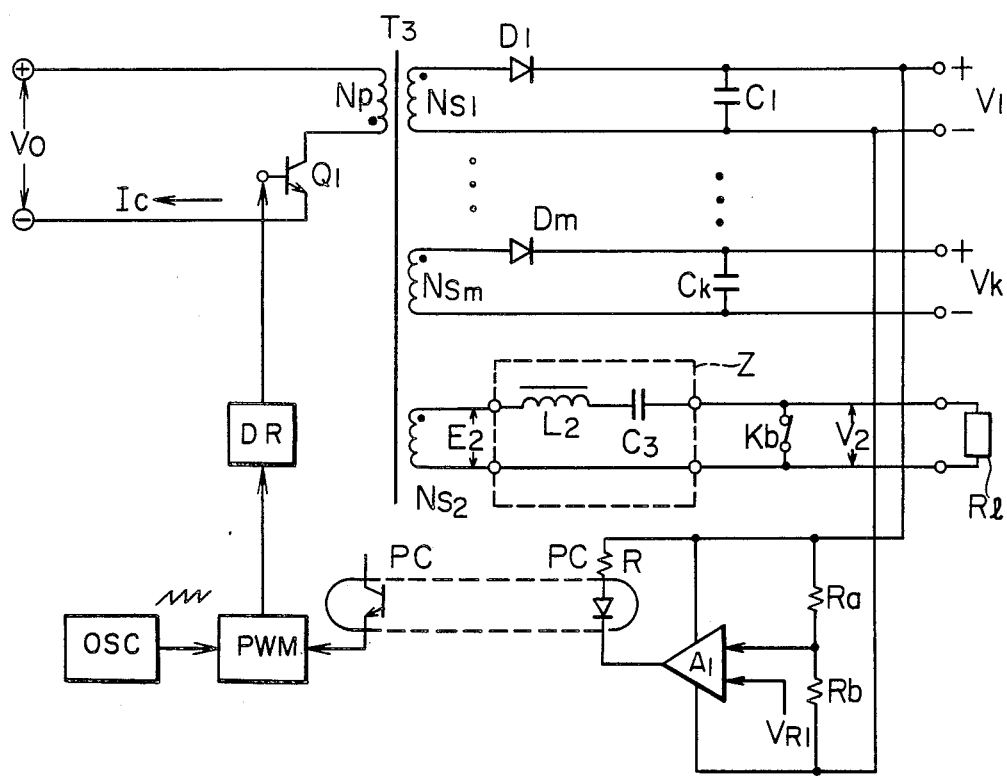
FIG. 1 is a circuit diagram showing a first embodiment of the stabilized electric power apparatus of the present invention.
Figure 25:
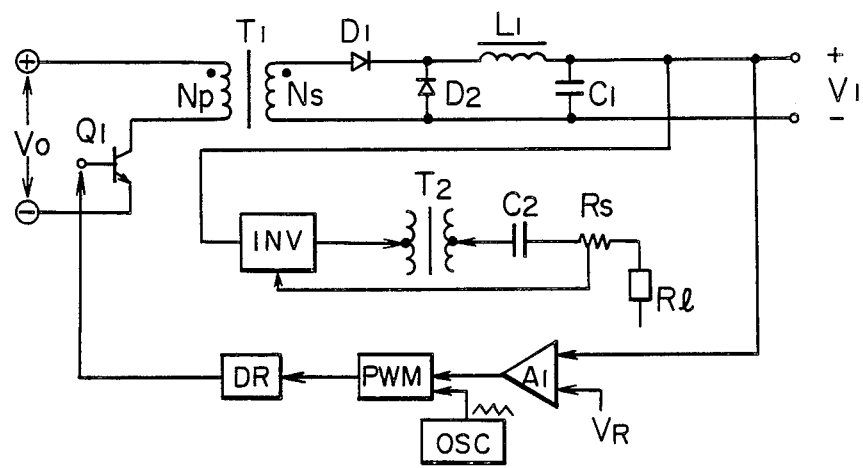
FIG. 25 is a circuit diagram showing an example of a conventional stabilized electric power apparatus.

FIG. 1 is a circuit diagram showing an embodiment of the stabilized electric power apparatus of the present invention. The reference numerals in FIG. 1 are similar to those in FIG. 25. The present embodiment is applied to a fly-back converter.

In FIG. 1, $V_0$ denotes a direct current electric power source, $Q_s$ denotes a transistor for switching, $T_3$ denotes a transformer for a fly-back converter, $N_p$ denotes the primary coil, $N_{S1}$ and $N_{sm}$ denote the secondary coil for direct current output magnetically combined with the primary coil, $N_{S2}$ denotes the secondary coil for alternating current output magnetically combined with the primary coil $N_p$.

$D_1$ and $D_m$ denote diodes for rectifying the second coils $N_{S1}$ and $N_{sm}$, $C_1$ denotes a smoothing capacitor, $L_2$ denotes a choke coil provided with the secondary coil $N_{S2}$ connected in series, $C_3$ denotes a filter capacitor which is connected in series with choke coil $L_1$, $K_b$ denotes a relay joint provided with alternating current output lines connected in parallel, Rl denotes an alternating current load.

$A_1$ denotes an error amplifying circuit which compares the direct current outputted by the secondary coil $N_{S1}$ with the standard voltage $V_{R1}$ and outputs signals, depending on the difference (the electric power is supplied from the direct current output $V_1$), PC denotes a photo coupler, R denotes a resistor for electric current control, OSC denotes an oscillation circuit which generates triangular waves, PMW denotes a pulse width modulating circuit which compares signals outputted by the error amplification circuit $A_1$ with triangular waves outputted by the oscillation circuit OSC and outputs a pulse so that the pulse width can be changed, depending on the movement of the cross-point of both signals, and DR dentes a drive circuit which amplifies the pulse and adds it to the base of the switching transistor $Q_1$.

By the output of the drive circuit DR, a duty factor of the transistor $Q_1$ is controlled and the direct current output voltage $V_1$ is stabilized.

The operation of the alternating output circuit connected with the secondary coil $N_{s2}$ will be described.

The energy is accumulated in the transformer $T_3$ during the period $T_{on}$ for which transistor $Q_1$ is ON. And the energy accumulated in the transformer $T_3$ is supplied to the direct and alternating current load through $N_{s2}$ and $N_{sm}$.

It is necessary to continuously feed energy to an alternating current load Rl, during a period for which transistor $Q_1$ is ON. Energy fed to the alternating current load Rl is fed from the primary side of a transformer $T_3$ since a current Ip runs through a primary coil Np.

Figure 2:
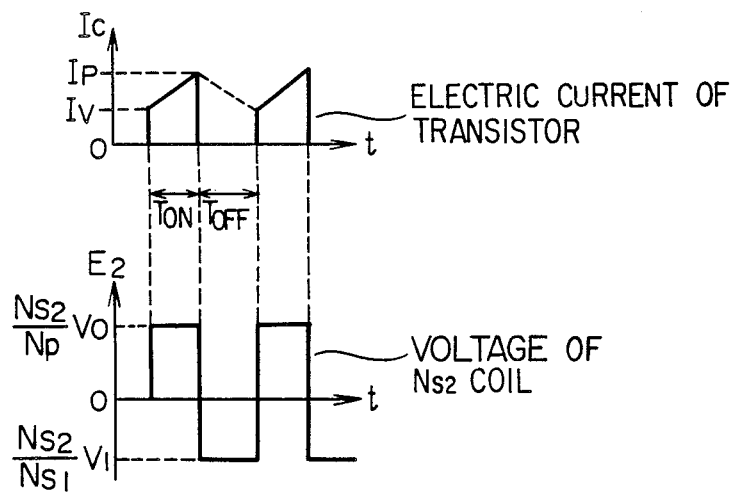
FIG. 2 is a view showing the description of switching.

FIG. 2 shows the relationship between the ON/OFF states of the collector current Ic of a transistor $Q_3$ and a voltage $E_2$ created in a secondary coil $NS_2$. As mentioned above, during the period for which transistor $Q_1$ is ON, a voltage $E_0$ is induced by a primary side input voltage $V_0$ while during the period for which transistor $Q_1$ is OFF, it is induced by direct current output voltages $V_1$ and $V_k$. An example of direct output voltage $V_1$ alone is shown in FIG. 2. In the case of a plurality of direct output voltages, the value of the voltage $E_0$ during the turn-off period of the transistor $Q_2$ is the sum of voltages induced by the magnetic coupling between secondary coils $NS_1$ and $NS_{n1}$, which create direct current output powers, added with a secondary coil Nsp.

Explanation will now be made of the operation of the forward type converter shown in FIG. 1, which is a forward type converter in which the transformer $T_3$ has two secondary coils $NS_1$ and $NS_2$, and creates one alternating current output voltage $V_2$ and one direct current output voltage $V_1$.

In the forward type converter as shown in FIG. 1, a feedback circuit for stabilizing the direct current output voltage $V_1$ is provided for the direct current output side of the switching transistor $Q_1$. Since the amplitude of the basic wave of the alternating current output $E_2$ is substantially uniform even if the input voltage varies, there is no required circuit for making the amplitude of the load current from which a basic wave component is extracted uniform. The reason will be explained below.

The transformer $T_3$ is 0 during a change of one periodic flux. Therefore, the following equation can be obtained:

$$(N_{s1}/N_p) \cdot V_o \cdot T_{on} = V_1 \cdot T_{off}$$

And in the case where $V_0 = \underline{V_0}$ ($\underline{V_0}$ is the definite input voltage), "$T_{on}$" is selected so that "$T_{on}$" can be equal to "$T_{off}$", and the equation can be defined as, $$T_{on} = (V_o/V_o + \underline{V_o})T.$$

The $E_2$ wave can be expanded into the following fourier series:

$$\begin{aligned} E_2 = & A_1' \sin\omega t + \\ & A_2' \sin 2\omega t + \\ & A_3' \sin 3\omega t + \ldots + \\ & A_1'' \cos\omega t + \\ & A_2'' \cos 2\omega t + \\ & A_3'' \cos 3\omega t + \ldots \end{aligned}$$

Assuming that the amplitude of the k harmonic wave is Ak, the following equation is obtained:

$$Ak = \sqrt{[(Ak')^2 + (Ak'')^2]}$$

Assuming that the duty factor of the transistor $Q_1$ is $\lambda$, $$\lambda = V_o/(V_o + \underline{V_o})$$

the equation of $Ak = (1/k\pi)(N_{s2}/N_p)V_o \times$ $$\sqrt{[(1 - \cos(2k\pi\lambda))^2 + (V_o + \underline{V_o})^2 \sin^2(2k\pi\lambda)]}$$

can be obtained.

Figures 3, 4:
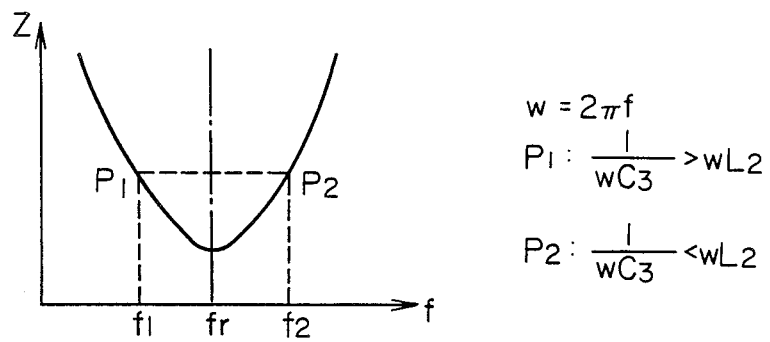
FIG. 3 is a view showing the relation between input voltage and the basic voltage amplitude.
FIG. 4 shows an impedance frequency function for the switching transistor Q, shown in FIG. 1.

When the basic amplitude of $V_o = 0.85\underline{V_o} \sim 1.15\underline{V_o}$, the results shown in FIG. 3 can be obtained. From this formula, the basic wave amplitude can be taken as being constant when $V_o = 0.85\underline{V_o} \sim 1.15\underline{V_o}$, with a deviation of several percentage points. Therefore, since basic wave component of alternating output voltage $E_2$ is obtained as voltage load $V_2$ by the following impedance circuit Z, a circuit for stabilizing the voltage load amplitude is not necessary.

An impedance circuit Z, connected to the secondary oil $NS_3$, has the dual roles of serving as a filter for extracting a basic wave component alone from the alternating current output $E_2$ and of stabilizing electrical current when the alternating current load Rl is connected to the secondary coil $NS_2$. The first role of impedance circuits of serving as a filter will now be explained.

FIG. 4 shows the relationship between an input impedance Z of the impedance circuit Z and frequency f when viewing an alternating current load Rl from the secondary coil $N_{s2}$ side. In this case, the input impedance Z is expressed by the equation, $$Z = j\omega L_2 + 1/(j\omega C_3) + R_1,$$

and resonance frquency fr can also be found from the equation, $$fr = \tfrac{1}{2}\pi \cdot 1/\sqrt{L_2 C_3}.$$

When the frequency of the basic wave is defined as fr, the impedance becomes larger for voltage $E_2$ and the current is reduced. In the current supplied to the impedance Z, the current of the higher harmonic wave is reduced and the voltage $V_2$ of the basic wave component is obtained from the alternating voltage $E_2$. By this, only the basic wave component substantially flows in the choke coil $L_2$ and the capacitor $C_3$.

The high harmonic wave current supplied in the distribution line of the alternating current load Rl brings about noise and exerts an undesirable influence on the power source, logic elements and other electronic circuit components which are weakened by intereference due to electromagnetic fields.

The second role of the impedance circuit Z for stabilizing electrical current will now be explained. When the alternating current load Rl is used an electric discharge lamp, such as a fluorescent lamp, the alternating current load has a negative resistance characteristic which allow voltage created in the load to decrease as current running through the load is increased while voltage created in the load is increased as current running through the load is decreased. When the load current is increased so that the alternating current $V_2$ is stabilized, the load voltage $V_2$ is decreased. Then, the difference between the alternating current output $E_2$ and the load voltage $V_2$ can be obtained and therefore, the load current is further increased. The increase in the load current further lowers the load voltage $V_2$ so that it is impossible to restrain the load current from increasing, resulting in damage of the circuit. When the load current is decreased, the decrease of the load current is further promoted due to the negative resistance characteristic of the load. The impedance circuit Z absorbs the difference between the load voltage $V_2$ and the alternating current output $E_2$, which is effected when the load current varies, and therefore, suppresses variations in the load current down to a small value. Accordingly, the impedance circuit Z is necessary for this situation.

Accordingly, as shown in FIG. 4 the switching frequency (basic wave frequency) of the switching transistor $Q_1$ is set to a frequency of $f_1$ or $f_2$ which is slightly shifted from the resonance frequency fr of the impedance circuit Z. Since the frequency of the basic wave is shifted from the resonance frequency fr, it is expected that the basic wave component of the alternating output voltage $E_2$ is delayed or that superfluous frequency components are taken out. However, the object of attenuation by the impedance circuit Z is to obtain a high frequency wave having a frequency which is n times as large as the frequency of the basic wave component, where n is an integer, and therefore, there is no problem if a shift from the resonance frequency can be held below the frequency fr. For this purpose, the choke coil $L_2$ and the capacitor $C_3$ can be used as stabilizers for the fluorescent lamp current.

Now the starting process of the fluorescent lamp Rl will be explained with reference to FIG. 5. In this embodiment, the relay joint $K_b$ connected in parallel with the lamp Rl is used to start the fluorescent lamp.

Initially, the relay joint $K_b$ is closed. When $K_b$ is opened at the start, the voltage $E_2$ is entirely loaded with lamp the Rl because the discharged current is not yet flowing.

The number of turns of the coil $N_{s2}$ is defined so that $E_2$ becomes higher than the discharge starting voltage of the fluorescent lamp. Consequently, when the joint $K_b$ is opened, the fluorescent lamp starts discharging.

After the fluorescent lamp Rl begins electrical discharge, electrical current runs through the impedance circuit Z, and therefore, useless voltage is consumed in the impedance circuit Z during electrical discharge of the fluorescent lamp Rl.

It is necessary to set the impedance of the impedance circuit Z so that the current supplied to Rl can be of the required value. If it has dispersion, it can amend the dispersion of impedance Z by providing the variable resistance with the OSC and adjusting the oscillation frequency f. In the apparatus of this embodiment when the duty factor of the transistor $Q_1$ is controlled the direct current output is stabilized.

Thus, the constant current can be flowed in setting the switching frequency of the transistor $Q_1$ by connecting the secondary coil $N_{s2}$ with the impedance circuit Z composed of choke coil $L_2$ and the condenser $C_3$, without influences of input voltage and changes in the load.

Subsequently, another embodiment of the present invention will be explained by using variable electric power circuit with alternating circuit to trans $T_3$ and by connecting the alternating output circuit with impedance Z.

Figure 5:
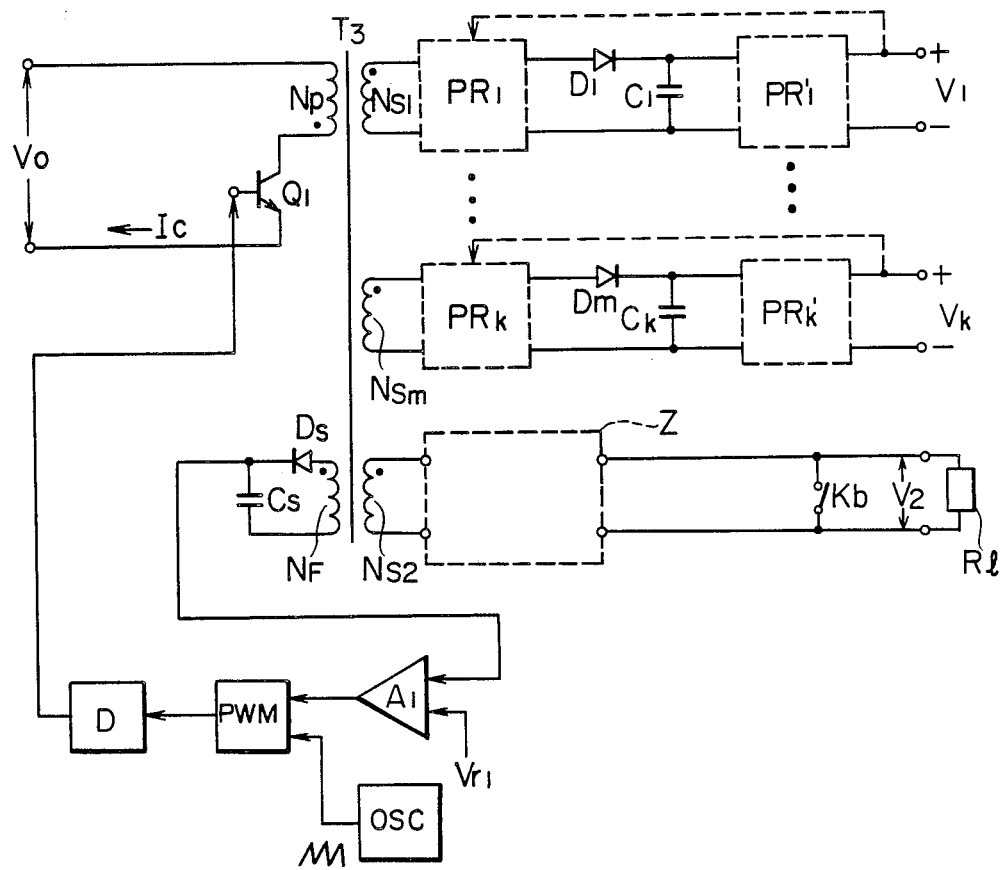
FIGS. 5 through 8 are circuit diagrams showing other embodiments of the present invention.

In FIG. 5, control voltage for stabilizing the output voltage is obtained from the coil $N_F$ provided with transformer $T_3$ in case the apparatus is applied to the fly-back converter.

In FIG. 5, $D_s$ is a rectifier, $C_s$ is a capacitor and other reference numerals are similar to FIG. 1. This embodiment shows that a photo-coupler for insulating the primary and secondary coils is unnecessary.

$PR_1 \sim PR_k$ shows the positions where a magnetic amplifier and a phase control circuit should optionally be provided (feed-back signals are obtained from the output $V_k$). $PR_1' \sim PR_k'$ also shows the positions where a series-pass regulator and so on should optionally be provided.

Another embodiment will be explained with reference to FIG. 6. This embodiment shows the present invention when it is applied to a forward converter.

Figure 6:
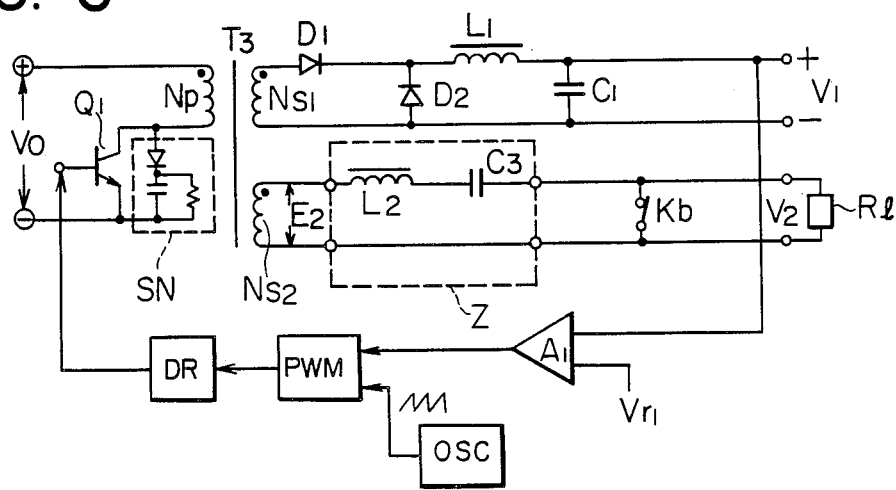

In FIG. 6, character $V_o$ denotes the direct current electric power, $Q_1$ denotes the switching transistor, $T_3$ denotes the inverter transformer, $N_p$ denotes the primary coil, $N_{s1}$ denotes the secondary coil for direct current output magnetically combined with the first coil $N_p$, $N_{s2}$ denotes the secondary coil for alternating current output magnetically combined with the first coil $N_p$, $D_1$ and $D_2$ denote the diodes for rectification of the secondary coil $N_{s1}$, $L_1$ denotes the choke coil connected with the secondary coil $N_{s1}$, $C_1$ denotes the smoothing capacitor, $L_2$ denotes the choke coil of the secondary coil $N_{s2}$, $C_3$ denotes the filter capacitor, $K_b$ denotes the relay joint, Rl denotes the alternating current load (fluorescent lamp).

$A_1$ denotes the error amplification circuit which compares direct current outputted by the secondary coil $N_{s1}$ with the standard voltage $VR_1$ and outputs signals depending on the difference, OSC denotes the oscillation circuit which generates triangular waves, PWM denotes the pulse width modulation circuit to output a pulse whose width changes, corresponding to the movement of the cross-point, DR denotes the drive circuit which amplifies the pulse and adds it to the base of the transistor $Q_1$.

In this embodiment, the direct output voltage is stabilized by controlling the duty factor of the transistor $Q_1$.

The loading of alternating current with the fluorescent lamp will now be described.

When the transistor $Q_1$ is ON, there is a positive half-wave of the voltage $E_2$ of the coil $N_{s2}$ for the fluorescent lamp through the choke coil $L_2$ and the capacitor $C_3$. When the transistor $Q_1$ is OFF, a negative half-wave of $E_2$ voltage from the back-electromotive force of the transformer $T_3$ is generated.

The negative half-wave cannot obtain the energy from the input when the transistor $Q_1$ is OFF. The voltage of the negative half-wave is also generated by the exciting energy of the transformer $T_3$, and the magnetic and electrostatic energy are accumulated by the choke coil $L_2$ and capacitor $C_3$ at the end of the positive period.

For this purpose, a gap is provided in the magnetic path and the exciting energy is increased so that the electric power of the coil $N_{s2}$ necessary for the period of the half-wave can be maintained.

All exciting energy at the end of the positive period and the energy accumulated by the choke coil $L_2$ and the capacitor $C_3$ are not necessarily absorbed by the fluorescent lamp.

The excess energy is accumulated by the choke coil and the capacitor $C_3$ at the end of the negative period again, part of which is consumed by a snubber circuit SN provided with the primary coil during the negative period (by a buffer circuit, which is composed of capacitor, resistor and coil provided for reducing stress with the transistor).

Figure 7:
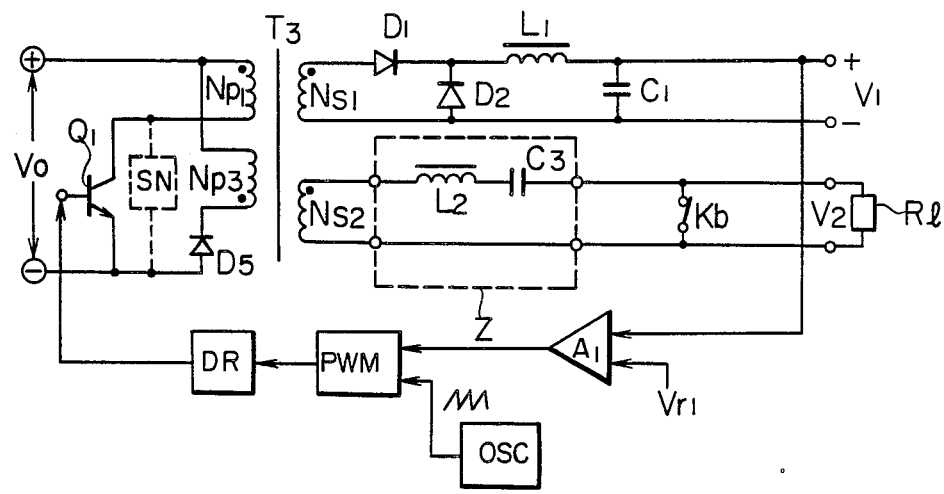

To reduce losses in the snubber circuit SN, as shown in FIG. 7, the reset coil $N_{p3}$ may be combined with the first coil $N_{p1}$ and provided so tht energy can be returned to the input line through the reset coil $N_{p3}$.

When the switching circuit on the primary coil $N_{p1}$ side of the transformer $T_3$ is a 2-transistor type such as a push-pull type or a half-bridge type, the energy of positive and negative half waves can be supplied from the input by alternately turning two transistors ON. Therefore, it is not necessary to rely on the exciting energy in the power source circuit with 2 switching transistors, so the gap in the magnetic path is unnecessary.

Figure 8:
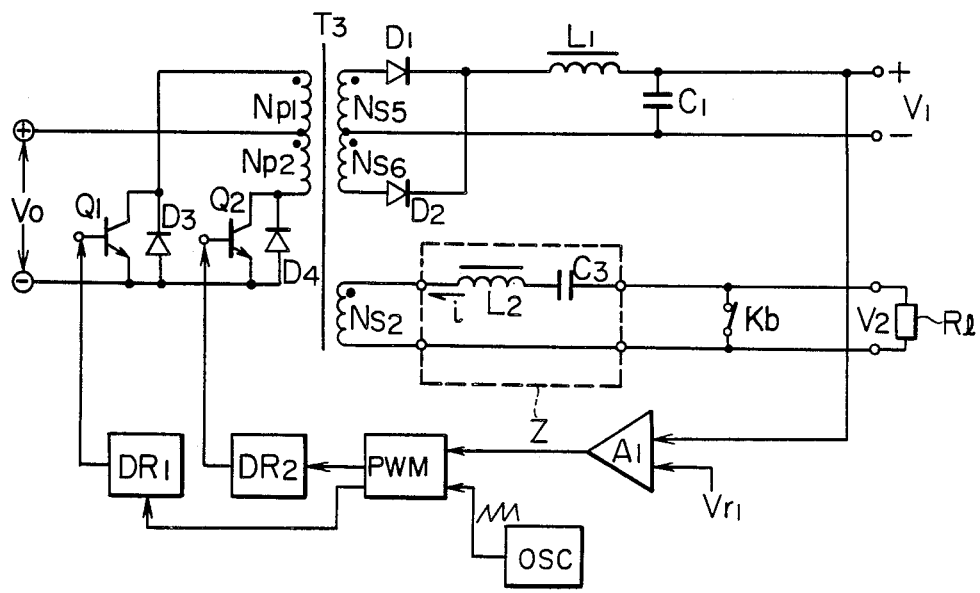

In FIG. 8, the diodes $D_3$ and $D_4$ are used for returning the energy of the alternating circuit to input side. The phase of electric current i of the secondary coil $N_{s2}$ is shifted to right or left by the value of the choke coil $L_2$ and capacitor $C_3$, on the basis of the ON-time of transistor $Q_1$.

Figure 9:
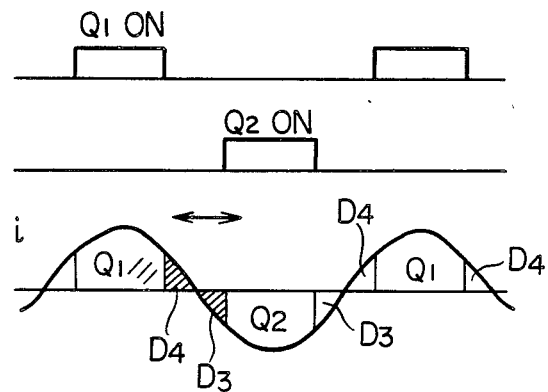
FIG. 9 is a view showing the diode functions of FIG. 8, FIGS. 10 through 12 are circuit diagrams showing further embodiments of the present invention.

FIG. 9 illustrates the above-mentioned electric current i. As shown in FIG. 9, when the transistors $Q_1$ and $Q_2$ are both OFF, the energy of the choke coil $L_2$ and the capacitor $C_3$ returns to the electric power source through the diode $D_3$ or $D_4$.

The returning amount of energy and which diode will be ON, differs with the value of the choke coil $L_5$, condenser $C_3$ and resistor R and ON-time pulse width (controlled by PWM) of transistors $Q_1$ and $Q_2$.

The operation of the impedance circuit Z installed in the secondary coil $N_{s2}$ is the same as the impedance circuit Z shown in FIG. 1. The dispersion of the impedance Z can be revised by installing a variable resistor in the oscillation circuit OSC and adjusting the oscillation frequency f.

Figure 10:
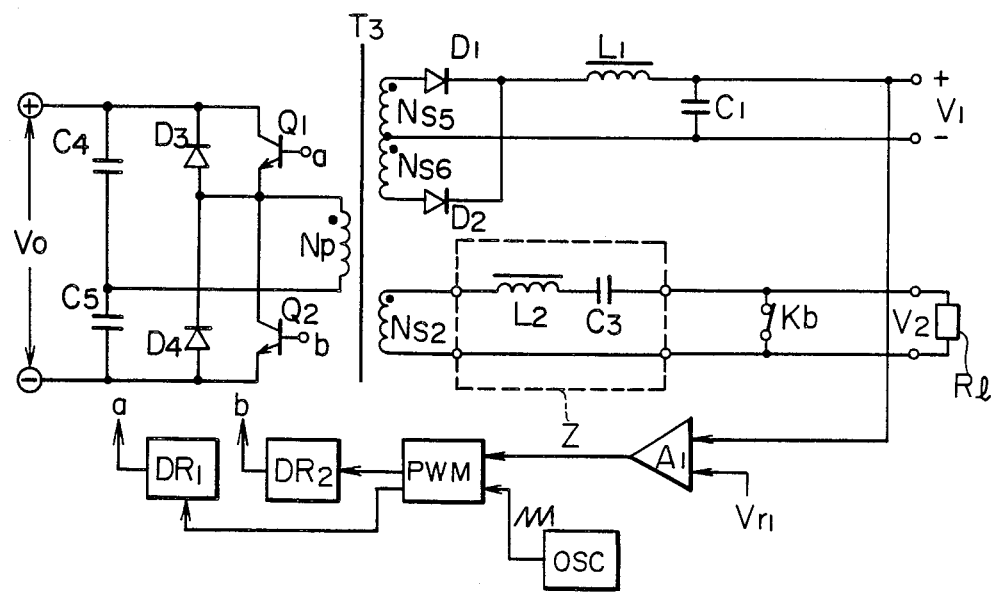

FIG. 10 shows the embodiment when the present invention is applied to a half-bridge converter. In this case, the required current can also be supplied to the alternating load by setting choke coil $L_2$ and the capacitor $C_3$ without influencing the change of the input voltage and the load.

In the general stabilized electric power apparatus, the use of an output channel which does not feed back increases the output voltage variation upon the interruption of the choke coil current. To improve this, countermeasures such as increasing the inductance of the choke coil is required for the output channel with large variation load.

However, the choke coil is necessary for all direct current output channels and this fact brings about another problem such as the increase in overall size of the choke coil.

To solve this problem, the use of a current-type converter is recommended. This converter is formed by converting a choke coil of each output channel to the input side of the transistor, and only one choke coil is required. This is advantageous because a small space for choke coil can be used.

Figure 11:
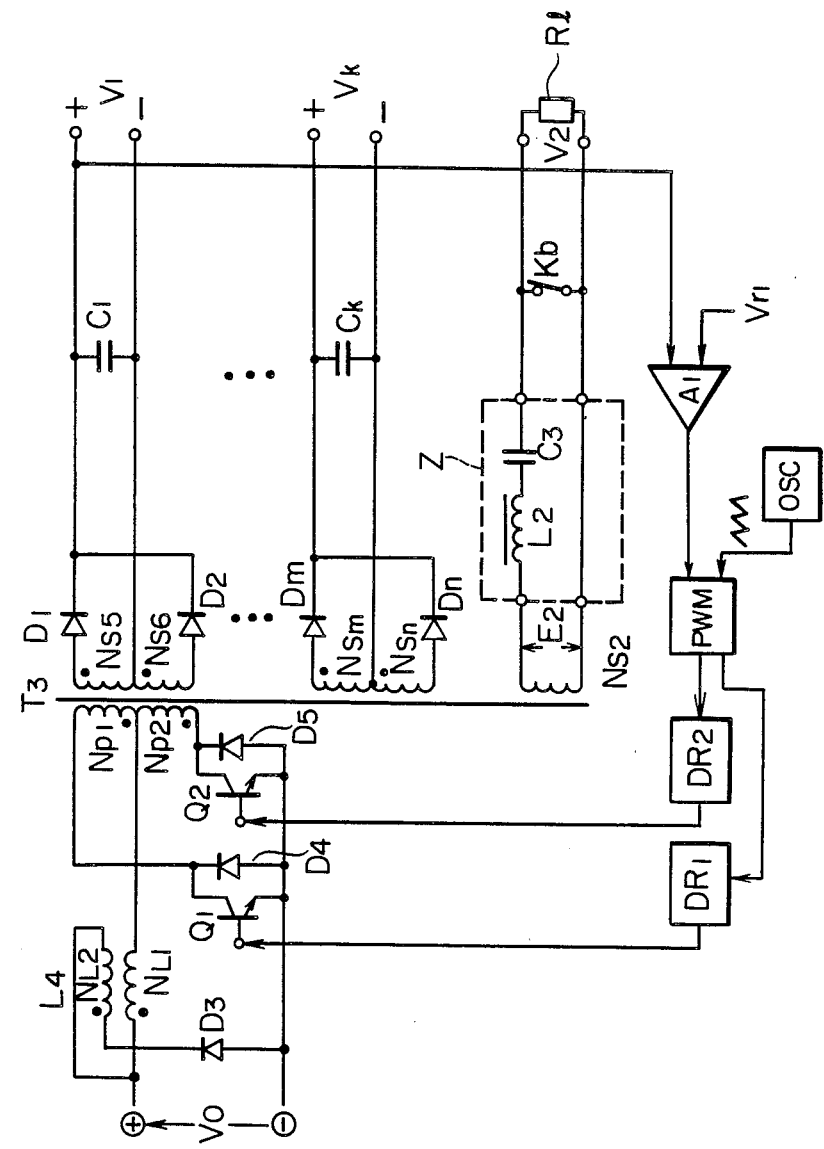

Another embodiment of the present invention based on the fact mentioned above will be described with reference to FIG. 11. FIG. 11 shows the embodiment when the present invention is applied to the current-type push-pull system.

In FIG. 11, $V_o$ denotes the direct current electric power, $L_4$ denotes the choke coil for input, $N_{L1}$ denotes the primary coil of a choke coil $L_4$, $N_{L2}$ denotes the secondary coil of a choke coil $L_4$, $D_3$ denotes the diode connected with $N_{L2}$ in series, $Q_1$ and $Q_2$ denote the switching transistors, $D_4$ denotes the diode provided between collector and emitter of the transistor $Q_1$, $D_5$ denotes the diode provided between collector and emitter of the transistor $Q_2$, $T_3$ denotes the inverter transformer, $N_{p1}$ and $N_{p2}$ denote the primary coils of $T_3$, $N_{s5}$ and $N_{s6}$ denote the secondary coils for direct current output which are magnetically combined with the primary coil $N_{p1}$ and $N_{p2}$, $N_{s2}$ denotes the secondary coil for alternating current output which is magnetically combined with the primary coils $N_{p1}$ and $N_{p2}$, $D_1$ and $D_2$ denote rectification diodes of the secondary oils $N_{s5}$ and $N_{s6}$, $C_1$ denotes the smoothing capacitor smoothing, $L_2$ denotes the choke coil of the secondary coil $N_{s2}$, $C_3$ denotes the filter capacitor, $K_b$ denotes the relay joint, $R_l$ denotes the alternating current load.

Also, $A_1$ denotes the error amplification circuit which compares the direct current outputted by the secondary coils $N_{s5}$ and $N_{s6}$ with the standard voltage $V_{R1}$ and outputs signals depending on the difference, OSC denotes the oscillation circuit generating triangular waves, PWM denotes the pulse width modulation circuit to compare signals outputted by the error amplification circuit $A_1$ with triangular waves outputted by the oscillation circuit OSC and to output a pulse whose width changes, depending on the movement of crosspoint, $D_{R1}$ and $D_{R2}$ denote the drive circuits which amplify the pulse and add it to the base of transistors $Q_1$ and $Q_2$.

In this stabilized electric power apparatus of this embodiment, the direct voltage $V_1$ is stabilized by controlling the duty factor of transistors $Q_1$ and $Q_2$. First, the motion of a choke coil $L_4$ will be explained. The choke coil $L_4$ operates to control the current so that the input current can be constant. When either transistor is ON, the energy is accumulated in the choke coil $L_4$. The energy accumulated in the choke coil $L_4$ is returned to the input electric power $V_o$ through an energy return coil $N_{L2}$ when the transistors $Q_1$ and $Q_2$ are OFF. As mentioned above, the voltage loaded with the primary coil becomes constant, the voltage is induced with each secondary coil and the direct current output voltage is generated in proportion to its turn ratio.

These voltages become substantially constant without regard to whether to the load is large or small. Accordingly, the choke coil for input is installed to control all output current.

In this embodiment, the direct output voltage is stabilized by controlling the duty factor of the transistors $Q_1$ and $Q_2$. Namely, the product of the voltage generated with the secondary coil $N_{s5}$ and $N_{s6}$ and ON-time of the transistors $Q_1$ and $Q_2$ is controlled to be constant without regard to the change in the input voltage and load. The required current can be supplied to the alternating load Rl with the adequate selection of the choke coil $L_2$ and the capacitor $C_3$ without influencing the change of input voltage and load.

Figure 12:
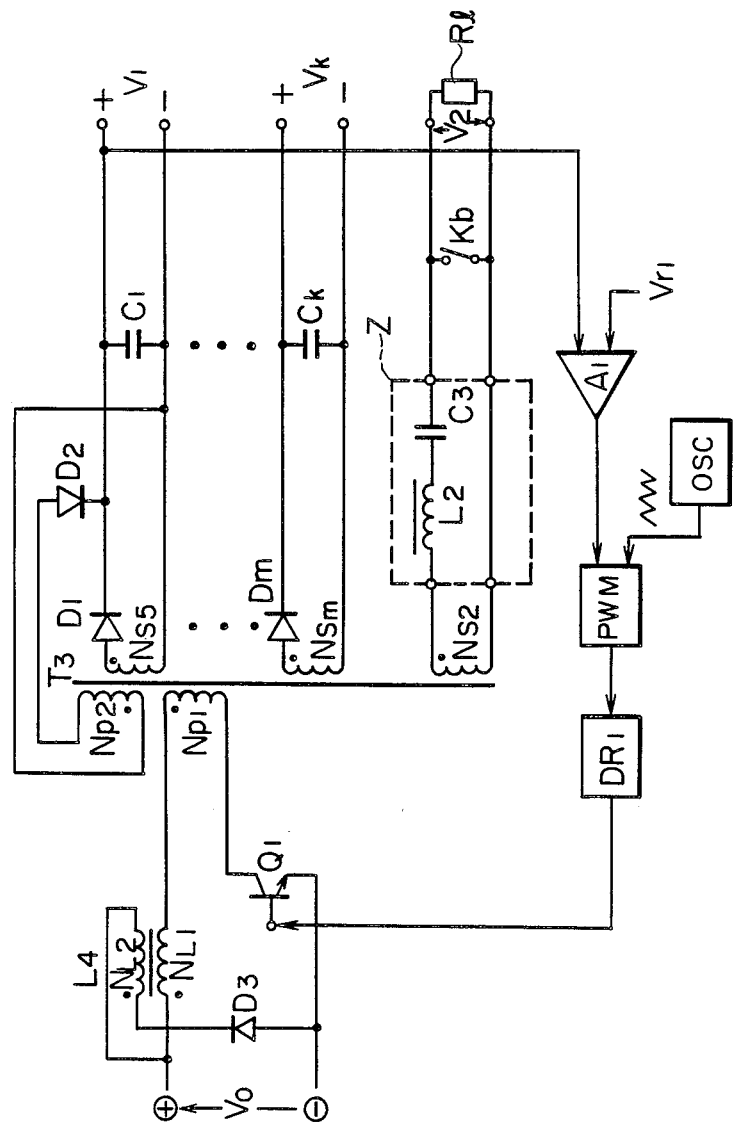

FIG. 12 shows the embodiment when the present invention is applied to the converter of a current type 1-transistor system. In FIG. 12, $L_4$ is a choke coil for inputting and other elements are similar to FIG. 11.

In this embodiment, when the transistor $Q_1$ is ON, the transformer $T_3$, excited by the coil $N_{p1}$, is magnetized from 0 to one side only on a B-H curve. This point is different from that in FIG. 11 using two switching transistors.

When the transistor $Q_1$ is ON, a half-wave part of the alternating current is induced through the secondary coil $NS_2$. When the transistor $Q_1$ is turned ON, no current runs through the direct current output coils $NS_1$ and $NS_{n1}$, and therefore, the remaining energy fed from the input side is stored or charged as energy for energizing the transformer.

When the transistor $Q_1$ is OFF, the exciting energy of the transformer $T_3$ is transferred to the load channel $V_1$ through a diode $D_2$ as the other half-wave of the alternating output current. Thus, the alternating current voltage waveform is generated with the alternating current load Rl by the coil $N_{s2}$.

The voltage waveform of the coil $N_{s2}$ is expressed by the following formula, corresponding to the positive and negative half-waves;

$$(N_{s2}/N_{s5})V_1, (N_{s2}/N_{p2})V_1$$

The alternating current voltage waveform of $N_{s2}$ can be equalized by realizing the equation $N_{s5}=N_{p2}$.

As described above, when the transistor $Q_1$ is OFF, the energy of the transformer $T_3$, supplied from the alternating current coil $N_{s2}$ to the alternating current load $R_1$, consists entirely of the exciting energy. For this reason, the transformer $T_3$ is required to have the exciting energy to maintain the electric power of a half-wave of the alternating current load by providing clearance on the magnetic path.

Figure 13:
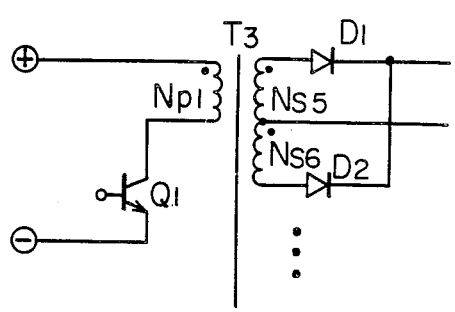
FIGS. 13 through 16 are circuit diagrams showing the transformed embodiment of the primary side circuit of FIG. 8, FIGS. 17 and 18 are circuit diagrams showing still further embodiments of the present invention.

In FIG. 13, emission of the exciting energy of the transformer $T_3$ is carried out by the coil $N_{s6}$. In this case, the alternating current voltage waveform of the coil $N_{s2}$ can be equalized by selecting the number of turns as $N_{s5}=N_{s6}$.

Figure 14:
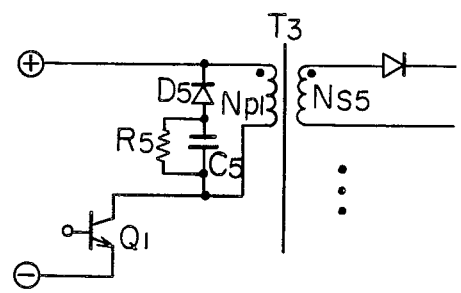

FIG. 14 illustrates that the partial exciting energy of transformer $T_3$ can be absorbed by a voltage clamp circuit comprising a diode $D_5$, a capacitor $C_5$ and a resistor $R_5$.

In this embodiment, the back-electromotive force of the coil $N_p$ can be $(N_p/N_{s5})V_1$, due to adequate selection of the time constant of the capacitor $C_5$ and the resistor $R_5$. When the transistor $Q_1$ is ON, the electromotive force of the coil becomes $+V_1$, and when the transistor $Q_1$ is OFF, the electromotive force of the coil becomes $-V_1$.

Similarly, the alternating current voltage waveform, whose positive and negative amplitudes are equal, is generated in the coil $N_{s2}$.

Figure 15:
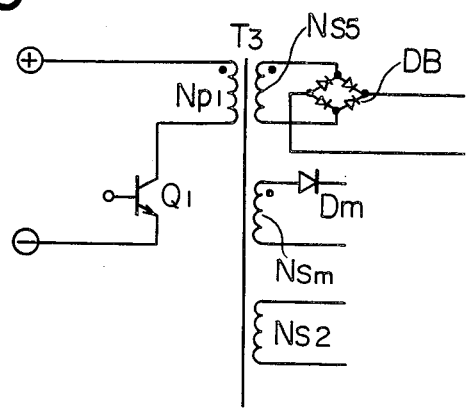

FIG. 15 shows another process for consuming the energy of the transformer $T_3$ through the coil $N_{s5}$. In this embodiment, the coil voltage can be led to the output side during either the ON or OFF period by installing a diode bridge DB with the coil $N_{s5}$ in series.

The diode bridge can supply both positive and negative half-waves when the induction voltage of the coil $N_{s5}$ is clamped with the output voltage $V_1$. In this manner, the alternating current voltage whose positive and negative half-waves is equal is generated with the coil $N_{s2}$.

Figure 16:
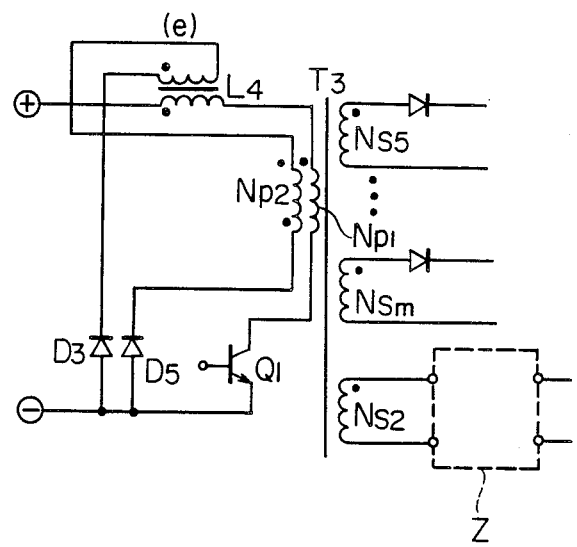

FIG. 16 shows the system for returning the partial exciting energy from the transformer to the input. In FIG. 16, $N_{p2}$ is a return coil which returns exciting energy to the input through a diode $D_5$.

The positive amplitude of the alternating current induced with the coil $N_{s2}$ is not equal to the negative amplitude. However, with regard to the coil voltage, the product of the positive voltage time is equal to that of the negative voltage time and electric power can be loaded with the alternating current load Rl, while the energy of the positive and negative voltages are maintained equal.

Another embodiment of the present invention will be described with reference to FIGS. 17 and 18. These embodiments illustrate use of the present invention in a current-type push-pull system.

Figure 17:
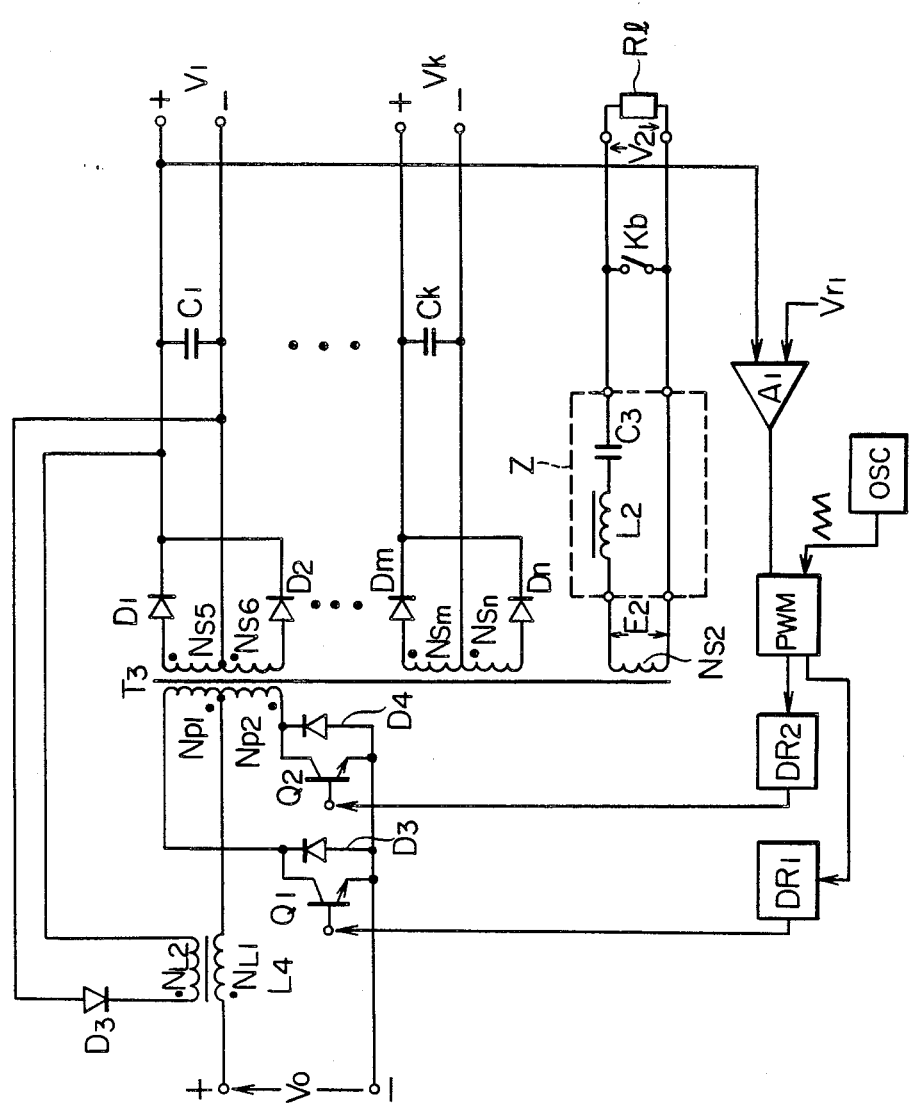

In FIG. 17, the energy of the choke coil $L_4$ is supplied from the direct current output voltage $V_1$ when transistors $Q_1$ and $Q_2$ are OFF.

Figure 18:
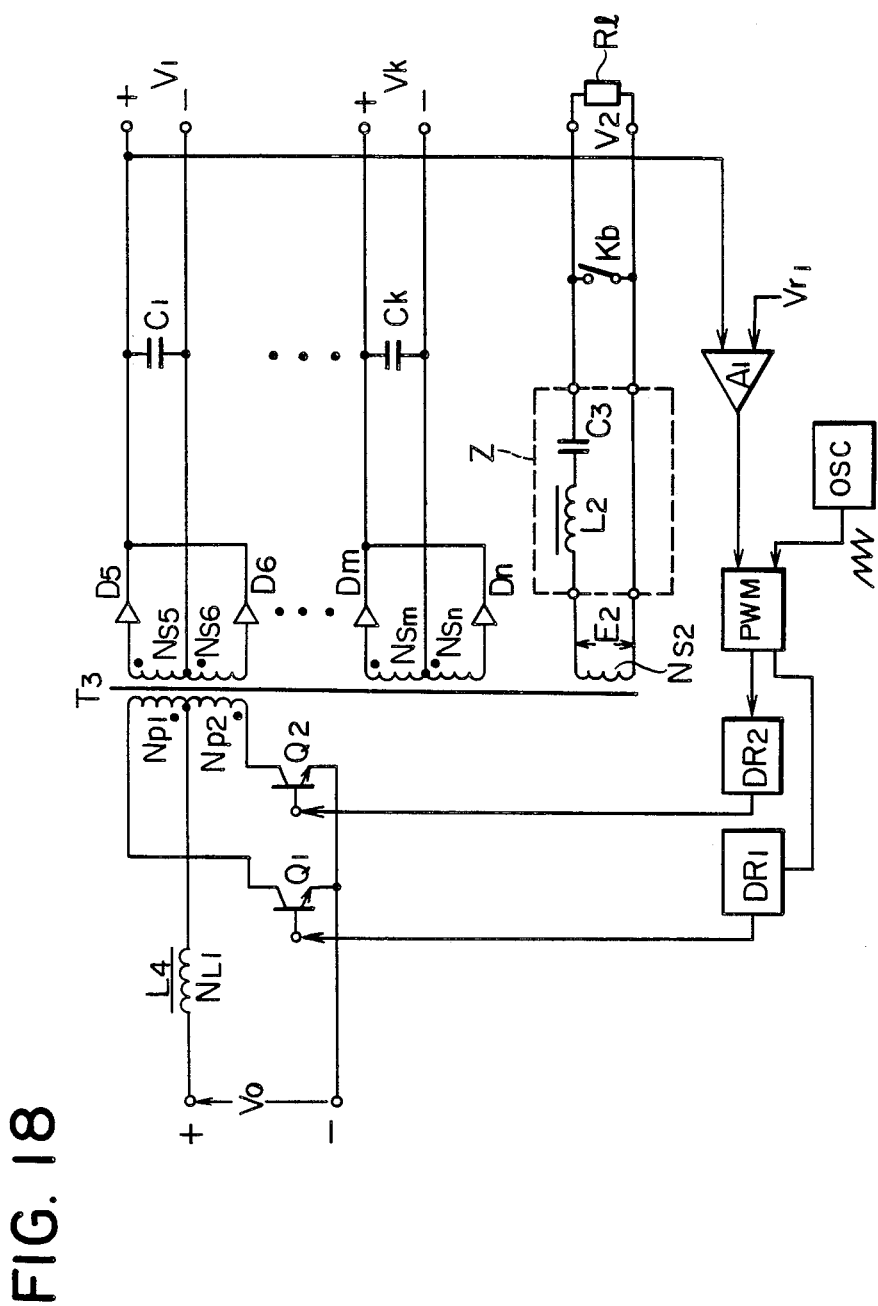

On the other hand, in the embodiment of FIG. 18, a return coil is not provided in the choke coil $L_4$. In this case, the transistors $Q_1$ and $Q_2$ are necessarily driven so that the duty factor of the transistors can be 50%~100%.

For this reason, there is a period of time for which the transistors $Q_1$ and $Q_2$ are ON simultaneously. During this period, the primary coil of the transformer $T_3$ is shortened by the two transistors without loading the input voltage. $V_o$ is entirely loaded by the choke coil $L_4$.

When the transistors $Q_1$ and $Q_2$ are OFF, the energy of the choke coil $L_4$ is added to the input energy and converted to the second coil side after being loaded with the first coil.

Figure 19:
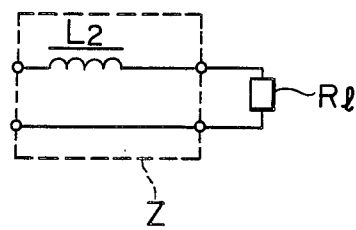
FIGS. 19 and 20 are circuit diagrams showing the transformed embodiment of impedance of each embodiment.

In each example mentioned above, the resonance circuit composed of the choke coil $L_2$ and the capacitor $C_3$ is used as a serial impedance circuit Z for the alternating current load. Instead of using coil $L_2$ and capacitor $C_3$, since impedance is required only for the negative resistance property of an alternating load, only one choke coil $L_2$ may be used as shown in FIG. 19.

The load current does not become a sine wave when only using choke coil $L_2$. And also it is possible to use the choke coil $L_2$ shown in FIG. 19 in the place of capacitor for the negative resistance property of an alternating load.

Figure 20:
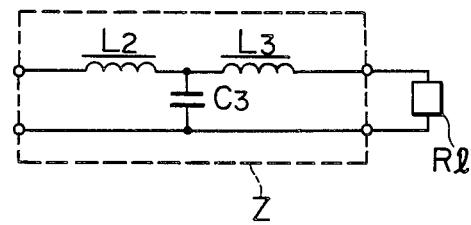

The combination of two choke coils $L_1$ and $L_2$ and the capacitor $C_3$ may also be used as shown in FIG. 20. In FIG. 20, the choke coil $L_2$ is operated as an impedance to control the current. The capacitor $C_3$ and the choke coil $L_3$ form a parallel resonance circuit.

The sine wave current can be supplied to the alternating current load Rl by setting the resonance frequency of the parallel resonance circuit to equal the switching frequency. And the choke coil can be used in place of capacitor.

Figure 21:
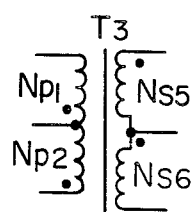
FIGS. 21 through 24 are circuit diagrams showing the transformed embodiment of a fluorescent lamp lighting circuit for each embodiment.
Figure 21:
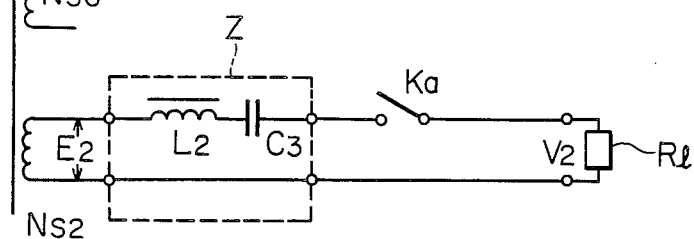

Therefore, in each embodiment mentioned above, the relay joint for lighting the fluorescent lamp has been connected with the alternating current load Rl in parallel, it can also be connected in series as shown in FIG. 21.

In the embodiment of FIG. 21, a relay joint $K_a$ is opened while the fluorescent lamp is not lit. When the fluorescent lamp is lit, the relay joint $K_a$ is closed.

At this time, since the fluorescent lamp does not emit anything, the current supplied to the fluorescent lamp is 0 and the voltage $E_2$ of the coil $N_{s2}$ is entirely loaded with the fluorescent lamp.

Thus, the fluorescent lamp starts emission because its voltage is higher than that at the start. Then, the current is supplied to the fluorescent lamp and the voltage $E_2$ is reduced by the impedance Z, and therefore, the required voltage for lighting can be loaded with the fluorescent lamp when the values of the choke coil $L_2$ and the capacitor $C_3$ are determined in advance.

The process for connecting the fluorescent lamp FL in the present invention will now be described.

Figure 22:
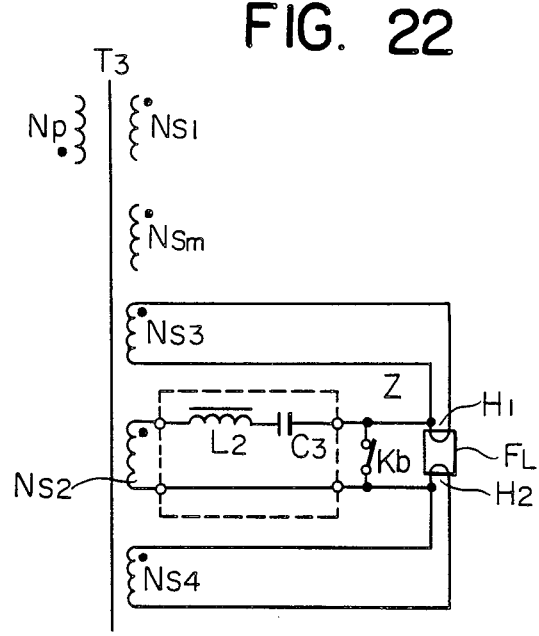

In FIG. 22, the required heater voltage for a heater of a fluorescent lamp FL is supplied from the coils of two heaters which are $N_{s3}$ and $N_{s4}$ of a transformer.

By this system, the heater coil is required to have only one or two turns, and voltage becomes several volts per turn. However, the setting of the coil at a unit of an integer may change the generating voltage substantially.

Figure 23:
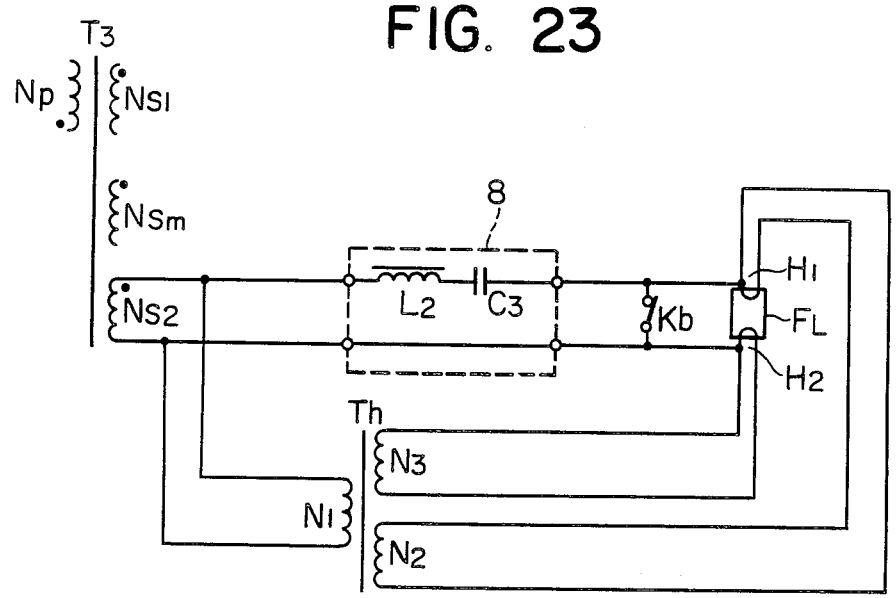

In FIG. 23, this problem is eliminated by installing an transformer Th for the heater. This method enhances the degree of freedom of heater coil design and can make a fine adjustment of the heater voltage.

Figure 24:
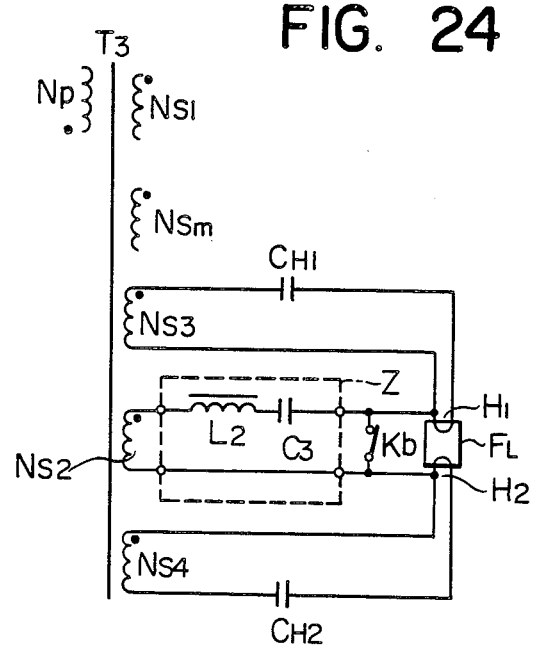

In FIG. 24, capacitors $C_{H1}$ and $C_{C2}$ are connected with heaters in series as impedances so that the heater voltage can be set to the required value.

As described above, in the stabilized power apparatus of the present invention, due to the provision of the impedance circuit connected to the secondary coils of the transformer for creating alternating power, variations in voltage applied to an alternating current load can be absorbed by the impedance of the impedance circuit even through the above-mentioned alternating current load has a negative resistance characteristic. Furthermore, since the impedance circuit connected to the secondary circuit for alternating current power is used as a resonance circuit, and the switching frequency of the switching transistor is shifted from the resonance frequency of the resonance circuit so that the resonance circuit has a certain impedance, the output alternating current can be stabilized, and can have a substantially sinusoidal waveform. Furthermore, since the aforementioned impedance circuit is composed of an resonance circuit and a coil or a capacitor, and the switching frequency of the switching transistor is adjusted to the resonance frequency of the resonance circuit, alternating current output can be a stabilized sinusoidal electrical current.

What is claimed is:

1. A stabilized electric power apparatus, comprising:
   switching means for converting direct current into an alternating current pulse by switching;
   a primary coil for inputting the generated pulse;
   a plurality of secondary coils, being connected electrically to said primary coil and corresponding to both direct and alternating current outputs;

impedance means including choke coil means connected in series with one of said plurality of secondary coils corresponding to the alternating current output for stabilizing the current output thereof and for operating as ballast;

control means responsive to the output voltage of one of said plurality of said secondary coils corresponding to the direct current output and for controlling said switching means so that the output of said direct current output and said alternating current output are constant; and negative resistance means connected with said secondary coil for alternating current output.

2. The stabilized electric power apparatus according to claim 1, wherein said impedance means includes a choke coil and a capacitor connected in series with said secondary coil for alternating current output.

3. The stabilized electric power apparatus according to claim 1, wherein said impedance means includes a primary and a secondary choke coil connected in series with said coil for alternating output, and a capacitor connected in parallel with said coil for alternating current output.

4. The stabilized electric power apparatus according to claim 1, wherein said negative resistance means includes a fluorescent lamp.

* * * * *